United States Patent
Geng et al.

(10) Patent No.: US 10,749,342 B2
(45) Date of Patent: Aug. 18, 2020

(54) POWER SHARING IN AN APPLIANCE

(71) Applicant: BREVILLE PTY LIMITED, Alexandria (AU)

(72) Inventors: Bin Geng, Ashfield (AU); Eddie Siu, Beaconsfield (AU); Lochana Subasekara, Caringbah (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 0 days.

(21) Appl. No.: 15/735,577

(22) PCT Filed: Jun. 9, 2016

(86) PCT No.: PCT/AU2016/000200
§ 371 (c)(1),
(2) Date: Dec. 11, 2017

(87) PCT Pub. No.: WO2016/197182
PCT Pub. Date: Dec. 15, 2016

(65) Prior Publication Data
US 2018/0301900 A1   Oct. 18, 2018

(30) Foreign Application Priority Data

Jun. 10, 2015   (AU) .................................. 2015902177

(51) Int. Cl.
*F24C 7/08*   (2006.01)
*A47J 27/62*   (2006.01)
(Continued)

(52) U.S. Cl.
CPC ............. *H02J 3/14* (2013.01); *A47J 43/0716* (2013.01); *H02J 2310/14* (2020.01);
(Continued)

(58) Field of Classification Search
CPC ..... H02J 3/14; H02J 2003/143; Y04S 20/242; Y04S 20/222; Y02B 70/3266; Y02B 70/3225; A47J 43/0716
See application file for complete search history.

(56) References Cited

U.S. PATENT DOCUMENTS 4,064,485 A * 12/1977 Leyde ..................... G01R 21/00
                                                           307/39
5,543,667 A    8/1996 Shavit et al.
(Continued)

FOREIGN PATENT DOCUMENTS

EP    0 828 406 A1    3/1998
RU    2521611 C2      7/2014
(Continued)

OTHER PUBLICATIONS

Extended European Search Report for European Patent Application No. 16806425.1, dated Oct. 1, 2018.
(Continued)

*Primary Examiner* — Kenneth B Wells
(74) *Attorney, Agent, or Firm* — Marshall, Gerstein & Borun LLP

(57) ABSTRACT

A method and apparatus for power allocation across multiple loads. The method comprising the steps of: allocating available power between two or more power load elements, wherein a ratio of power allocated to a load element is based on a priority and measured parameters; and dynamically updating the power allocated to a load element as power requirements change.

19 Claims, 13 Drawing Sheets

(51) Int. Cl.
*G05B 15/02* (2006.01)
*H02J 3/14* (2006.01)
*A47J 43/07* (2006.01)

(52) U.S. Cl.
CPC ....... *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 6,157,008 | A | 12/2000 | Brown et al. |
| 7,420,293 | B2 | 9/2008 | Donnelly et al. |
| 8,793,021 | B2 | 7/2014 | Watson et al. |
| 9,820,603 | B2 * | 11/2017 | Singer .................. A47J 31/404 |
| 9,906,029 | B2 * | 2/2018 | Grohman .................. H02J 3/14 |
| 10,147,148 | B2 * | 12/2018 | Wu .......................... H02J 3/46 |
| 2010/0070091 | A1 | 3/2010 | Watson et al. |
| 2012/0323392 | A1 | 12/2012 | Gerdes et al. |
| 2015/0148980 | A1 | 5/2015 | Singer et al. |
| 2015/0303693 | A1 * | 10/2015 | Wu .......................... H02J 3/14 307/31 |

FOREIGN PATENT DOCUMENTS

| | | |
|---|---|---|
| WO | WO-1995/029572 A1 | 11/1995 |
| WO | WO-2010/136328 A1 | 12/2010 |

OTHER PUBLICATIONS

International Search Report and Written Opinion for PCT/AU2016/000200, dated Aug. 31, 2016.

Decision to Grant issued in Russian Patent Application No. 2018100108 dated Jan. 24, 2020.

* cited by examiner

POWER SHARING IN AN APPLIANCE

FIELD OF THE INVENTION

The present invention relates to domestic kitchen appliances and in particular to domestic kitchen appliances having a plurality of significant power load elements.

The invention has been developed primarily for use as a heated blender (having a heater load element and a motor load element) and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Many countries place restrictions on domestic appliances such as the maximum power that can be drawn from a power outlet. For example, an appliance connected to a standard power outlet in the United States is only allowed to draw 1800 watts. In appliances that have more than one significant load element (e.g. heater load element and/or motor load element), each load element is typically selected such that the total power that may be drawn, assuming all load elements are on, does not exceed the regulatory power limit. An appliance having a plurality of load elements may result in a significant limitation in the power rating for each load element such that the total power that may be drawn, assuming all elements are on, does not exceed the regulatory limit.

There is a need in the art for an apparatus or method that can incorporate a plurality of load elements while meeting regulatory requirements of not drawing more than the regulated power, while incorporating load elements that have power ratings which sum to greater than a regulatory power limit.

SUMMARY OF THE INVENTION

It is an aspect of the technology to overcome or ameliorate at least one of the disadvantages of the prior art, or to provide a useful alternative.

It is an aspect of the technology, in a preferred form, to provide an appliance having a plurality of power load elements each having a respective power rating, wherein the power ratings sum to a total power, and wherein a controller module controls operation of each of the power load elements such that the power drawn by all elements at any time of operation does not exceed a predetermined power limit that is less that the total power.

The predetermined power limit may be set or predetermined by regulatory requirements for general power outlets. The predetermined power limit may be set by regulatory requirements for general power outlets less any system power required or background power allocation.

The control module allocates portions of the predetermined power limit to the respective power load elements. The control module may allocate power according to a priority condition. The priority condition may change over time. The control module may further use feedback of required power, in allocating portions of the predetermined power limit.

The control module receives, for one or more load elements, operating parameters for controlling operation of the load elements. The control module may use feedback control to control operation of the load elements to a user configured operating parameter. An operating parameter may include a setting indicative of motor speed and/or a setting indicative of temperature and/or a setting indicative of motor/rotational torque.

Operating parameters may change during an operating cycle. Operating parameters may be set by a user through a user interface. Changing operating parameters may change priority conditions. A load element associated with the most recently changed operating parameter may take priority when allocating available power.

The load element may be a heater load element, a motor load element, or a condenser load element.

The appliance may be a heated blender having a heater load element and a motor load element, the power rating of the heater load element and the motor load element sum to a total power limit that exceeds a regulatory power limit for general power outlets, wherein a control module controls each power load element according to a priority condition (e.g. either heater priority or motor priority) and a respective power required feedback (e.g. heater power required and/or motor power required) such that the power drawn by all elements at any time of operation does not exceed the regulatory power limit.

The control module may use feedback control to control the heater load element and motor load element to operating parameters of desired temperature and desired motor speed respectively without exceeding a respectively allocated portion of the regulatory power limit. The allocated portion of the regulatory power limit may be actively adjusted during an operating (or cooking) cycle based on the priority condition and/or power required.

Alternatively, the control module may use feedback control to control the heater load element and motor load element to operating parameters of desired temperature and desired motor torque respectively without exceeding a respectively allocated portion of the regulatory power limit. The allocated portion of the regulatory power limit may be actively adjusted during an operating (or cooking) cycle based on the priority condition and/or power required.

Operating parameters may change during an operating cycle according to a predefined recipe sequence. Operating parameters may be adjusted by a user through a user interface. Changing operating parameters may change priority conditions. A load element associated with the most recently changed operating parameter may take priority when allocating available power.

It is an aspect of the technology, in a preferred form, to provide a method of controlling an appliance having a plurality of power load elements each having a respective power rating, wherein the power ratings sum to a total power; such that the power load elements are each controlled such that the power drawn by all elements at any time of operation does not exceed a predetermined power limit that is less that the total power.

It is an aspect of the technology, in a preferred form, to provide a method of power allocation comprises:
  a. Allocating/sharing power between two or more power load elements, wherein the power sharing ratio is: based on (a) a priority, and (b) measured and set operating parameters (e.g. one or more of speed, torque, temperature, time); and
  b. dynamically/iteratively updating the power allocation or share as the power requirements change for the system and/or each relevant load element.

The load element with the highest priority may receive all the power required for that load element to achieve the target operating parameter (e.g. set speed or temperature for a specified period of time). It would be appreciated that the power budget may not be exceeded and power remains available/unallocated.

The load element with the second highest priority may receive the power required for that load element or the excess power after the highest priority load element has received its required power.

The load element with the next highest priority may receive the power required for that load element or the excess power after the load elements with higher priority have received their required or allocated power.

The priority of a load element may be based on the operating parameters, and the order in which they are received. The operating parameters may include speed and/or heat and/or time.

Power allocation may include calculating ratios of the power required for a load element to maintain a power budget.

According to a further aspect of the technology there is provided a computer program product stored on a computer usable medium, the computer program product comprising: a computer readable program means for performing a method as herein described.

BRIEF DESCRIPTION OF THE DRAWINGS

A preferred embodiment of the technology will now be described, by way of example only, with reference to the accompanying drawings in which.

DETAILED DESCRIPTION

An apparatus or method may incorporate a plurality of load elements while meeting regulatory requirements of not drawing more than the regulated power, while incorporating load elements that have power ratings which sum to greater than a regulatory power limit, wherein the appliance is controlled such that the power drawn is less than the regulatory power limit. It would be appreciated that this would allow load elements to be incorporated having a respective power limit that is significantly larger than would be otherwise available.

Figure 1A:
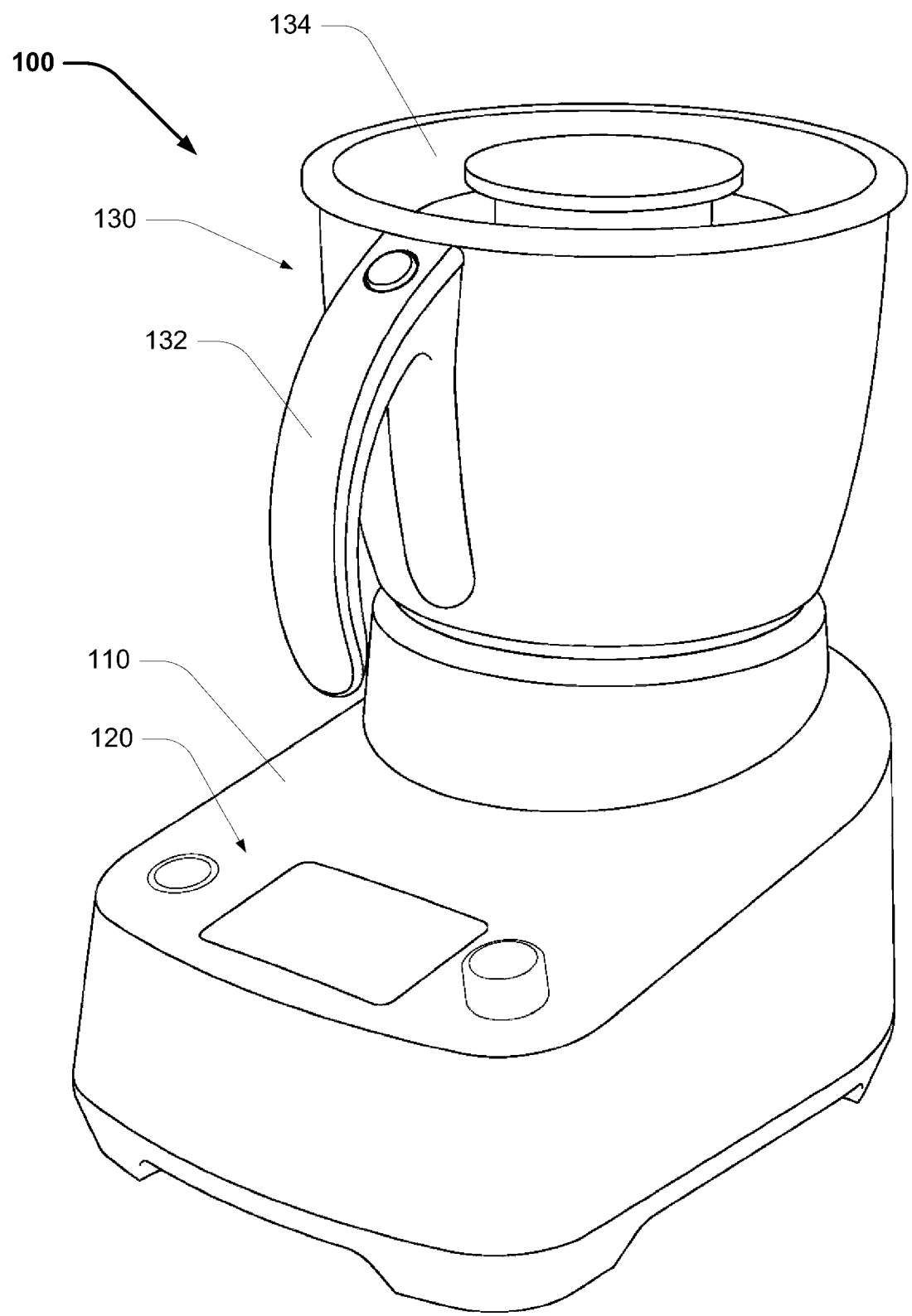
FIG. 1A shows an embodiment apparatus comprising a heater load element and a motor load element.
Figure 1B:
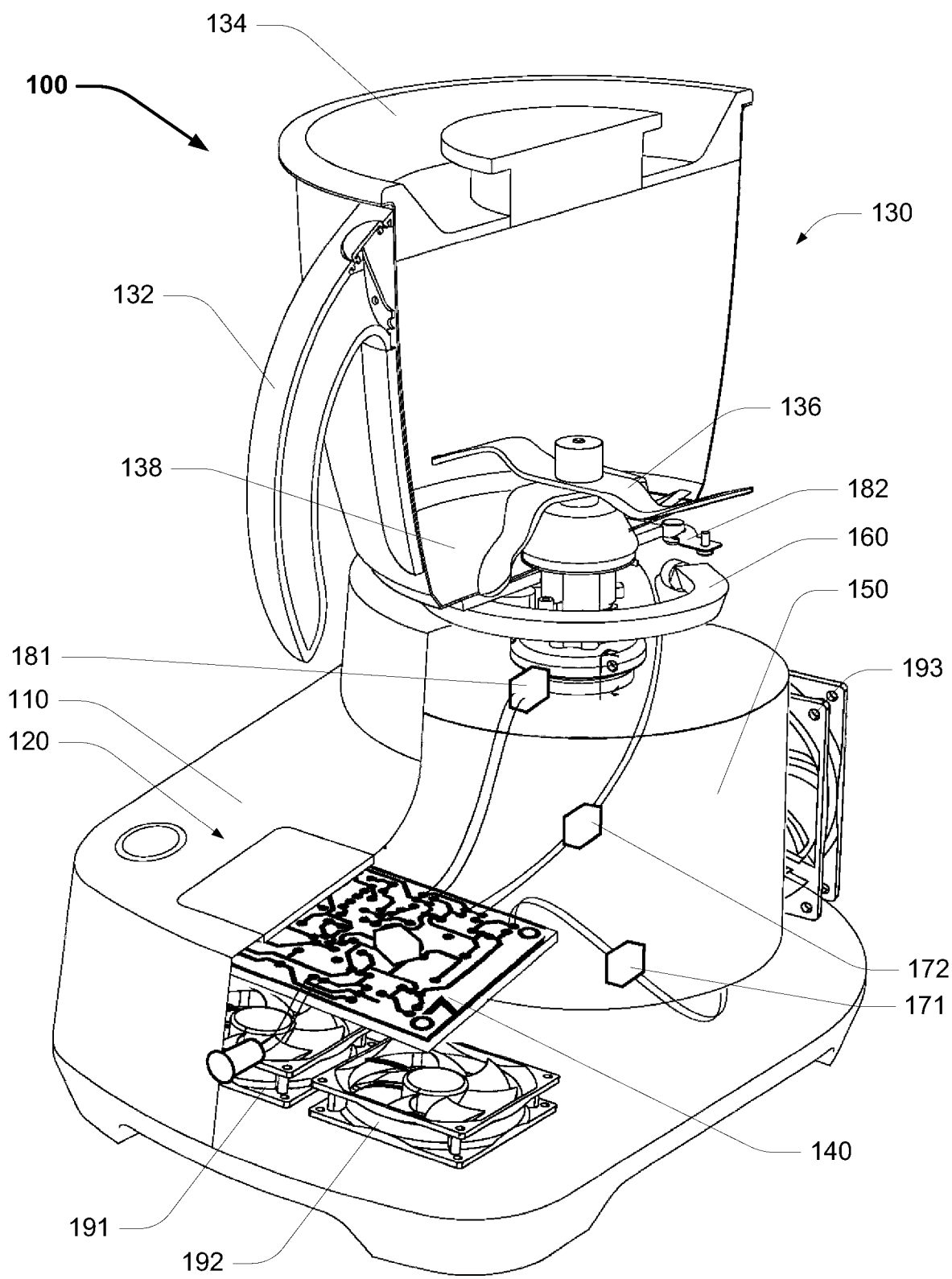
FIG. 1B shows a partially sectioned apparatus according to FIG. 1A.

FIG. 1A and FIG. 1B show an embodiment heated blender 100 that includes a base 110 having a user interface 120. The base supports a removable cooking vessel 130. The removable cooking vessel 130 includes a handle 132 and a lid 134.

Referring to FIG. 1B, the appliance 100 further includes a controller module (e.g. printed circuit board or a processor module) 140 that controls a heating load element 150 and a motor load element 160.

The motor load element 150 is coupled to cutting blades 136 located within the vessel.

The heating element 160 is in thermal communication with a heat distribution plate 138 of the vessel for heating ingredients therein.

Sensors 171, 172 (e.g. power sensors and/or current sensors and/or voltage sensors) are associated with the motor load element and the heating load element respectively. The sensors 171, 172 are coupled to the control module 140 for enabling measurement of the power currently being used by the respective load element.

A speed sensor 181 and temperature sensor 182 are also associated with the motor load element and the heater load element respectively. The sensors 181,182 are coupled to the control module 140 for enabling feedback control of motor speed and temperature heating. In an alternative embodiment, the sensors 181,182 may be coupled to the control module 140 for enabling feedback control of motor torque and temperature heating.

It would be further appreciated that the current sensor 171 and the speed sensor 181, each associated with the motor load element 150, can enable the control module 140 to provide speed feedback control of the motor while monitoring the current power consumption and restricting power consumption below a predetermined allocated power limit.

It will be appreciated that the current sensor 172 and temperature sensor 182, each associated with the heating load element 160, can enable the control module 140 to provide temperature feedback control of the heater while monitoring the current power consumption and restricting power consumption below a predetermined allocated power limit.

By way of example only, in an appliance that incorporates both a heater and a motor (for example operating blender or blade), the total available power from a standard power outlet is shared or split between the two load elements, such that the heater and blender can operate in tandem. For example, a standard power outlet in the United States is 1800 watts. An appliance may therefore provisionally allocate 800 watts to the motor and 1000 watts to the heater.

In an effort to increase the performance of the appliance, power can be actively portioned to the heater and the blender to maximise the performance characteristics of these separate elements.

Power to the motor is governed through a speed feedback sensor. For example, in an unloaded state, only a small amount of power is required to maintain even a high speed for the blending blades (e.g. 10,000 RPM). However, when the blades are loaded with ingredients, the power required to maintain a speed setting of 10,000 RPM is significantly increased. If the blender component was permanently limited to a predetermined threshold (e.g. 800 watts), once this limit was reached, motor speed would be compromised to prevent the motor from requiring more than a predetermined threshold. Limiting the motor speed will inevitably compromise the quality of the blending operation.

To overcome this, the motor may "borrow" power provisionally allocated to the heater (e.g. 1000 watts) that is not presently being required (or based on a priority determination), for maintaining the necessary motor speed (e.g. 10,000 RPM). The heater is operated through a temperature selection input or dial and display on the user interface, where a user enters a desired temperature and duration of operation. The operation of any power limit on the heater in this instance, may compromise the ability to reach the required temperature. However, the effects of this may be overcome by adding more cooking time. In this example, the motor can be given priority over the heating or temperature setting. In an example, while the motor borrows power from the heater, the timer on the heater may be paused until the required power for the heater is made available. The power split allocation can vary depending on the blending load, but the total power drawn by the appliance is limited to the regulatory power limit for a general power outlet.

The user interface may also enable a user to select a recipe. The recipe includes a plurality of steps or sequences that define operation of the heater and the blender, depending on the nature of the step. The recipe may include an indication as to whether or not the heater or blender has priority when allocating power.

If insufficient power is available to meet requirements to maintain the operation parameter (e.g. temperature or motor speed), additional time may be automatically added to the operation of the respective load element.

It will be appreciated that system elements may also factor into the power budget, such that the apparatus may continue to operate. The power budget may allocate necessary power for system elements including permanent power consumption (e.g. user interface 120 and control module 140) and intermediate or switched power consumption (e.g. cooling fans 191,192,193). Being necessary for operation of some appliance, these features may take overall priority. In an embodiment, a power budget ($P_{BUDGET}$) may be calculated for the controlled load element based on subtracting the current essential power drain by the system elements ($P_{SYSTEM}$) from the predetermined threshold power ($P_{TOTAL}$).

Figure 2:
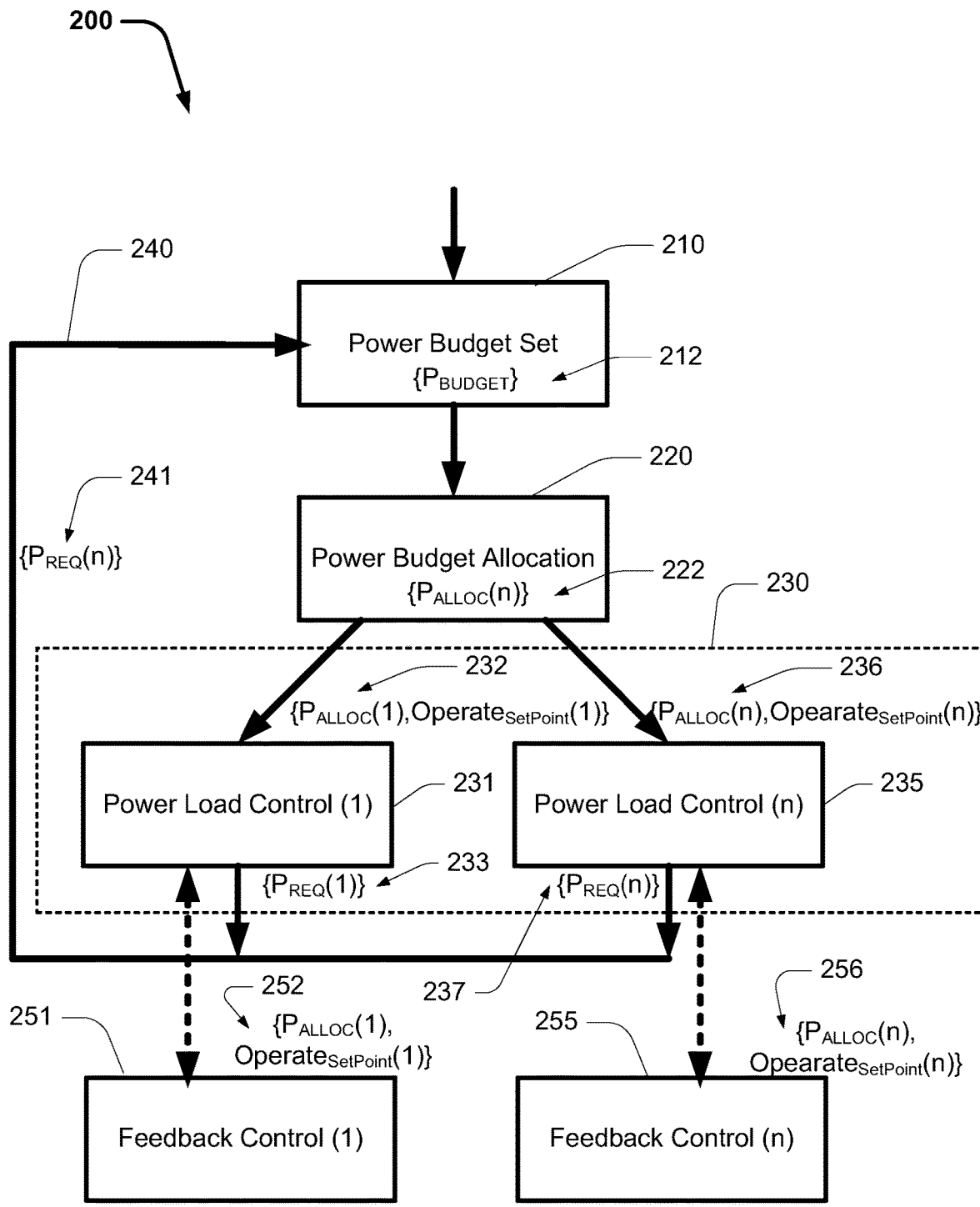
FIG. 2 is a flowchart of an example embodiment power sharing method for an appliance.

FIG. 2 shows a flowchart for an embodiment method 200 of dynamic power sharing across load elements of an apparatus.

By way of example only, a method 200 can include the steps of:

STEP 210: Setting a power budget $\{P_{BUDGET}\}$ (at 212) to be shared amongst all selected load elements; proceeding to step 220.

STEP 220: Allocating the power budget to each of the selected load elements $\{P_{ALLOC}(n)\}$ (at 222), being the maximum power that the load element can draw at that time; proceeding to step 230.

STEP 230: Monitoring each load element (at 321,235), with possible input of the allocated power budget $\{P_{ALLOC}(n)\}$ and/or Operating Set Point $\{Operate_{SetPoint}(n)\}$ of the load element (at 232,236), with possible input of the current measured power $\{P_{Current}(n)\}$ and/or measured operation parameters $\{Operate_{Measured}(n)\}$ of the respective load element, for calculating or determining a required power allocation $\{P_{REQ}(n)\}$ (at 233,237); proceeding to step 240.

STEP 240: Feeding back required power allocation $\{P_{REQ}(n)\}$ (at 421) to recalculate the power budget $\{P_{BUDGET}\}$ and power allocation $\{P_{ALLOC}(n)\}$; proceeding to step 210.

It will be appreciated that separate feedback control modules (at 251,255) can be used for each load element. The feedback control uses the respective Power Allocation $\{P_{ALLOC}(n)\}$ and Operating Set Point $\{Operate_{SetPoint}(n)\}$ of the load element (at 252,256), and measures the current operating parameter $\{Operate_{Measured}(n)\}$ to perform feedback control of the load element to achieve the Operating Set Point without exceeding the Power Allocation. It will be appreciated that feedback control of operating parameters (e.g. temperature or motor speed) can be implemented using any conventional or known feedback methods including, but not limited to, On-Off Control, Zero-Crossing Control, Phase-Angle Control, Proportional Control, Proportional-Derivative Control, Proportional-Integral Control, Proportional-Integral-Derivative Control (PID control), and Third-Order Control Systems. If the feedback control module is unable to achieve the Operating Set Point without exceeding the Power Allocation, the feedback control module may calculate an estimated power requirement for achieving the Operating Set Point.

Each load element is monitored to a performance parameter or set point (e.g. rotational speed or temperature) while limiting power used to the allocation power budget. In an example, a first load element (e.g. a heater load element) can be controlled using a control module 251 according to a performance parameter (e.g. a temperature set point), while limiting power used to an allocated power budget, thereby operating on input parameters including allocated power and a set point (at 252). In an alternative example, a first load element (e.g. a motor load element) can be controlled using a control module 251 according to a performance parameter (e.g. a motor speed set point), while limiting power used to an allocated power budget, thereby operating on input parameters including allocated power and a set point (at 252). The controller module may further provide an indication of power required to reach the set point, which may be greater than or less than the power allocated.

The required power allocation $\{P_{REQ}(n)\}$ may be calculated using one or more of: a recipe requirement, predetermined parameters, current (or changes in) operating set points $\{Operate_{SetPoint}(n)\}$ required for the load element, and current measured operation $\{Operate_{Measured}(n)\}$ for the load element. The operating set points $\{Operate_{SetPoint}(n)\}$, and current measured operation $\{Operate_{Measured}(n)\}$ for a heating load element or motor load element can be Cooking Temperature or Motor Speed respectively. The required power allocation may be preconfigured or seeded for power budget allocation (step 220).

For each of the separate power load elements (at 235), power allocated and set point (at 236) can be used to provide indication of the power required to reach the set point (at 237).

It will be appreciated that power allocation can be indicative of an absolute power measure (e.g. in Watts or other non-standard units) or a percentage of total system power $\{P_{SYSTEM}\}$ or power budget $\{P_{BUDGET}\}$.

The power budget available $\{P_{BUDGET}\}$ can be predetermined, or can be adjusted according to current system load $\{P_{SYSTEM}\}$. The current system load can be calculated or estimated based on the known power consumption of essential systems components, such as processor modules (Printed Circuit Boards), user interfaces and cooling fans. It will be appreciated that, as the overall power consumption cannot exceed a predefined regulatory limit $\{P_{TOTAL}\}$, System Power $\{P_{SYSTEM}\}$ can be actively adjusted and/or set to a predetermined maximum. System Power $\{P_{SYSTEM}\}$ can be actively adjusted based on system components that: are currently active, are requested to be made active, or are anticipated to be activated in the future (e.g. cooling fans). System Power $\{P_{SYSTEM}\}$ can be actively adjusted based on current operating modes and/or operating set points.

Figure 3:
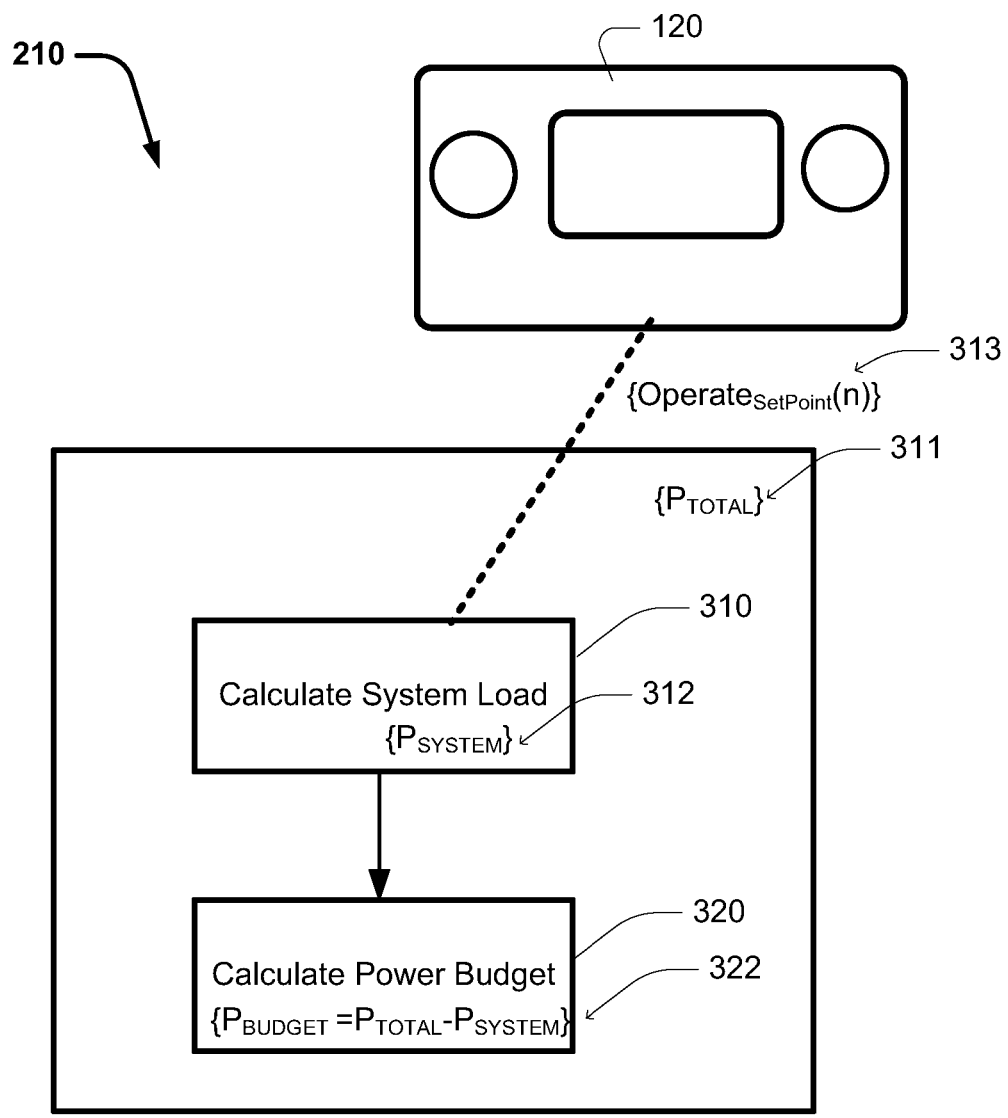
FIG. 3 is a flowchart of an example embodiment method of setting a power budget.

FIG. 3 shows a flowchart of an example embodiment method 300 for setting a power budget, previously described as step 210. The method 300 may include the steps of:

STEP 310: calculating a system load, proceeding to STEP 320; and

STEP 320: calculating a power budget.

Refereeing to step 310, when calculating a system load $\{P_{SYSTEM}\}$ (at 312), the calculated system load may be either an actual system load, predetermined maximum, or anticipated load. Calculating the system power load may further be influenced by the current appliance mode of operation or current operating set point (as configured by the user interface 120). The current operating set point (at 313) can provide triggers or conditions for calculating an anticipated system power load. For example, a system load $\{P_{SYSTEM}\}$ may be calculated by adding a predetermined offset for any one or more of the following conditions:

anticipated load for system components based on current appliance configuration;

anticipated load for system components based on a new appliance mode;

load values of actual system components being operated or activated; and load values of actual system components to be operated or activated.

Anticipating a power load may include expected changes of system components based on changes to appliance configuration or operating parameters (e.g. at 313).

Referring to step 320, wherein a predetermined threshold power is typically set by a regulatory power threshold $\{P_{TOTAL}\}$, a power budget $\{P_{BUDGET}\}$ may be calculated (at 322) by subtracting the system power $\{P_{SYSTEM}\}$ (or anticipated system power) from the regulatory power threshold $\{P_{TOTAL}\}$.

It will be appreciated that, in an alternative embodiment, the power budget $\{P_{BUDGET}\}$ may be predefined based on the predetermined threshold power $\{P_{TOTAL}\}$ less the total system load for all components not subject to power load sharing.

Figure 4:
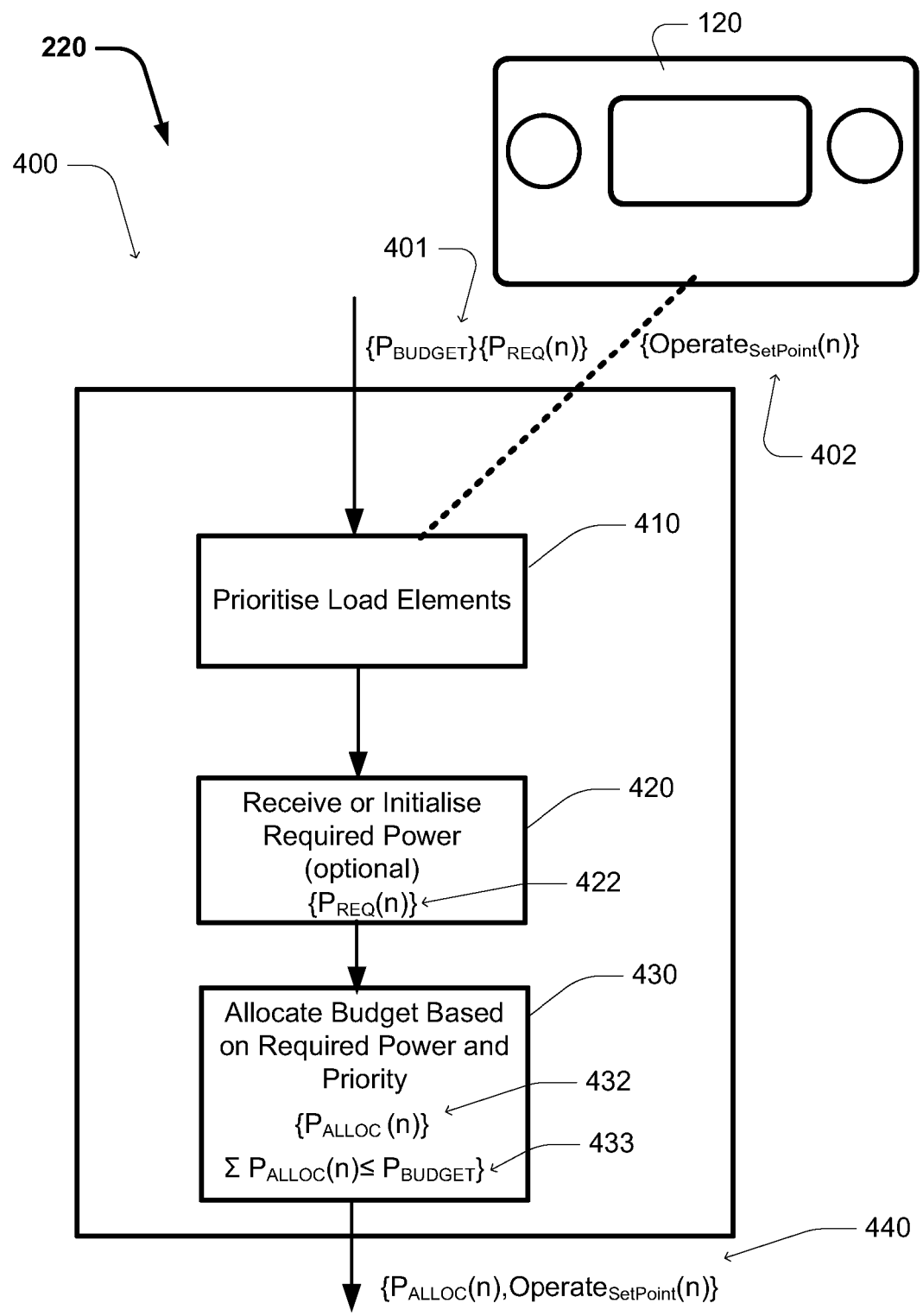
FIG. 4 is a flowchart of an example embodiment method of allocating a power budget.

FIG. 4 shows a flowchart of an example embodiment method 400 for allocating a power budget, previously described as step 220. This method of allocating a power budget may receive inputs of the power budget and the power requested or required for each of the load elements subject to power sharing (at 401).

By way of example only, the method 400 of allocating the power budget may include the steps of:

STEP 410: assigning priority to (or ordering) load elements for power allocation;

STEP 420: optionally receiving or initialising required power $\{P_{REQ}(n)\}$ for each load element (at 422);

STEP 430: allocating the available power budget based on required power and priority allocation to each load element under load sharing $\{P_{ALLOC}(n)\}$ (at 432), wherein the sum of all allocated power must be less that the power budget (at 433);

STEP 440: providing a power allocation $\{P_{ALLOC}(n)\}$, and optionally an operating set point $\{Operate_{SetPoint}(n)\}$, for each load element.

It would be appreciated that prioritising load elements (described as step 410) can be influenced by the current mode of operation of the appliance, or operating set points currently configured for the appliance. By way of example only, load elements for which a user has more recently manually changed an operating set point may be given the highest priority. Initial priories may also be set for each step of a particular menu sequence that is preconfigured or saved by the appliance. A menu is a sequence of operating steps for the appliance, which for each step defines operating set points and time durations for each active load element.

It would be appreciated that any initialisation of power required $\{P_{REQ}(n)\}$ for a particular load element may include, setting the required power initially to any one of the following:

a power rating of the load element;

a power value that has been predetermined and saved in association with a menu or cooking sequence; and a power value based on the current and/or future operating set point (for example, by way of a look up table or function).

It will be appreciated that the power required for a load element may be smaller for a lower set point and greater for a higher set point. Initialisation of power required may be based on the current and/or future operating set point.

It will also be appreciated that the allocation of the power budget may use any one or more techniques, including:

allocation of the required power in the order of priority until the total sum of the power allocated is equal to the power budget; and/or allocation of power proportionally, based on the percentage of power required being greater than the power budget, whereby respective allocations are a percentage of the requested or required power; and/or allocation of power as a combination of the above techniques, whereby one or more of the higher priority load elements are allocated their requested or required power (or greater) and the remaining load elements are allocated proportional amounts of their requested power.

By way of example only, a greater reduction of the requested or required power may be applied to lower priority elements—such that the sum of the total allocated power is within the power budget. The proportions reduction in allocated power may be based on some calculation or function (e.g. linear function).

It will be appreciated that the power required $\{P_{REQ}(n)\}$ by each load element, and the power allocated $\{P_{ALLOC}(n)\}$ to each load element, can be actively updated based on current configurations of the appliance and feedback from controller modules of each respective load element.

Figure 5:
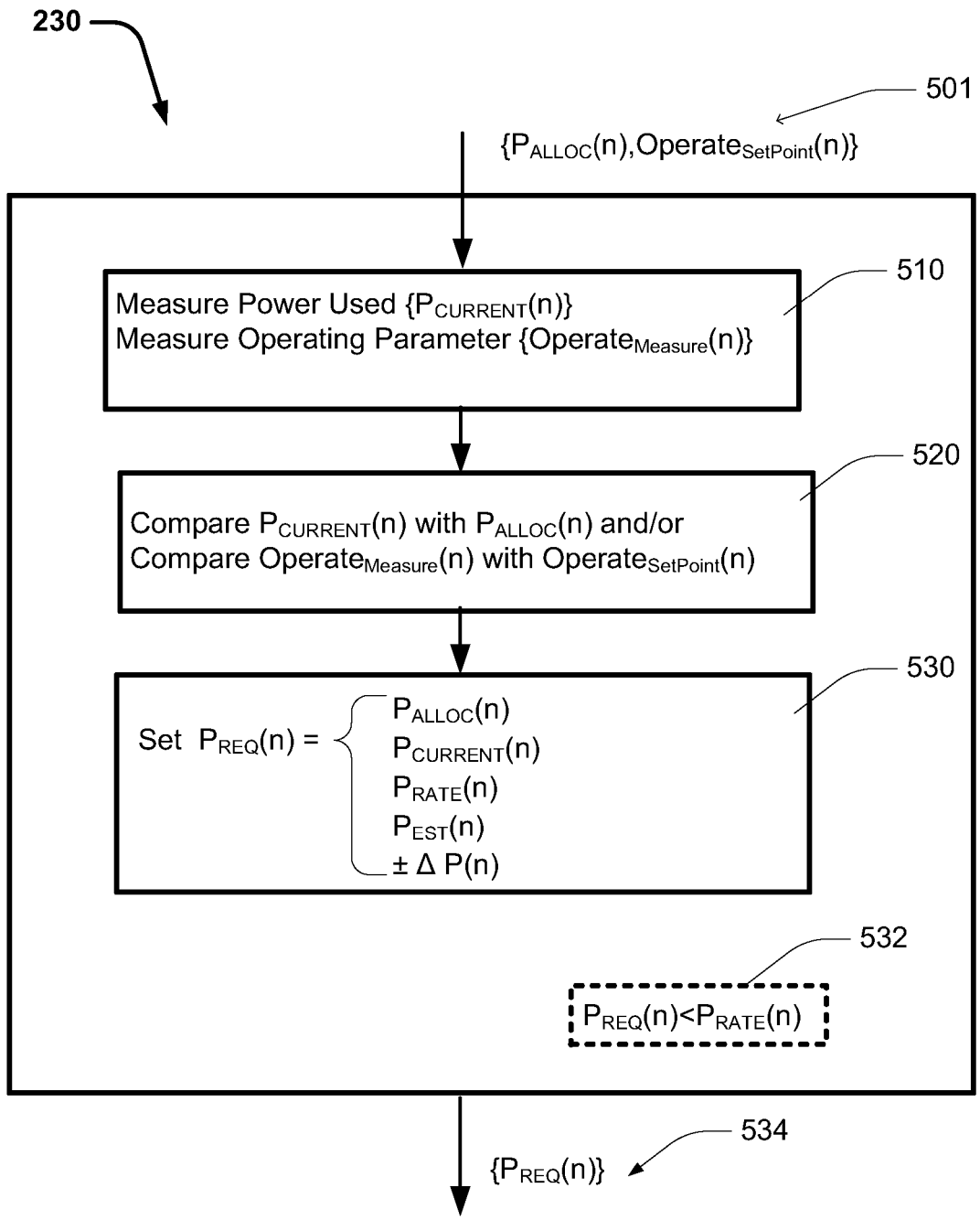
FIG. 5 is a flowchart of an example embodiment method of updating a required power.

FIG. 5 shows a flowchart of an example embodiment method 500 for updating the power required $\{P_{REQ}(n)\}$, previously described as step 230. The method 500 may include the steps of:

STEP 501: Receiving details of the $\{P_{ALLOC}(n)\}$, and optionally a respective operating set point $\{Operate_{SetPoint}(n)\}$;

STEP 510: Measuring the current power $\{P_{CURRENT}(n)\}$ being used by the load element, and the resulting operating parameter obtained $\{Operate_{Measure}(n)\}$;

STEP 520: Comparing $\{P_{CURRENT}(n)\}$ with $\{P_{ALLOC}(n)\}$ and/or comparing $\{Operate_{Measure}(n)\}$ with $\{Operate_{SetPoint}(n)\}$ for determining if more power (or less power) is required;

STEP 530: Setting or updating the power required $\{P_{REQ}(n)\}$ for the load element, noting that $\{P_{REQ}(n)\}$ cannot exceed the power rating {$P_{RATE}$ (n)} of the load element (at 532), and then presenting the updates power required {$P_{REQ}$(n)} (at 534).

FIG. 6 through FIG. 8B show some aspects of the technology regarding power sharing for an embodiment heated blender apparatus.

It will be appreciated that FIG. 6 through FIG. 8B teach an embodiment apparatus and method associated with a heated blender (for example, as shown in FIG. 1A or FIG. 1B). It will be further appreciated that this teaching is by way of example only, and that modifications can be made according to the earlier teaching. Some specific alternatives are also disclosed.

Figure 6:
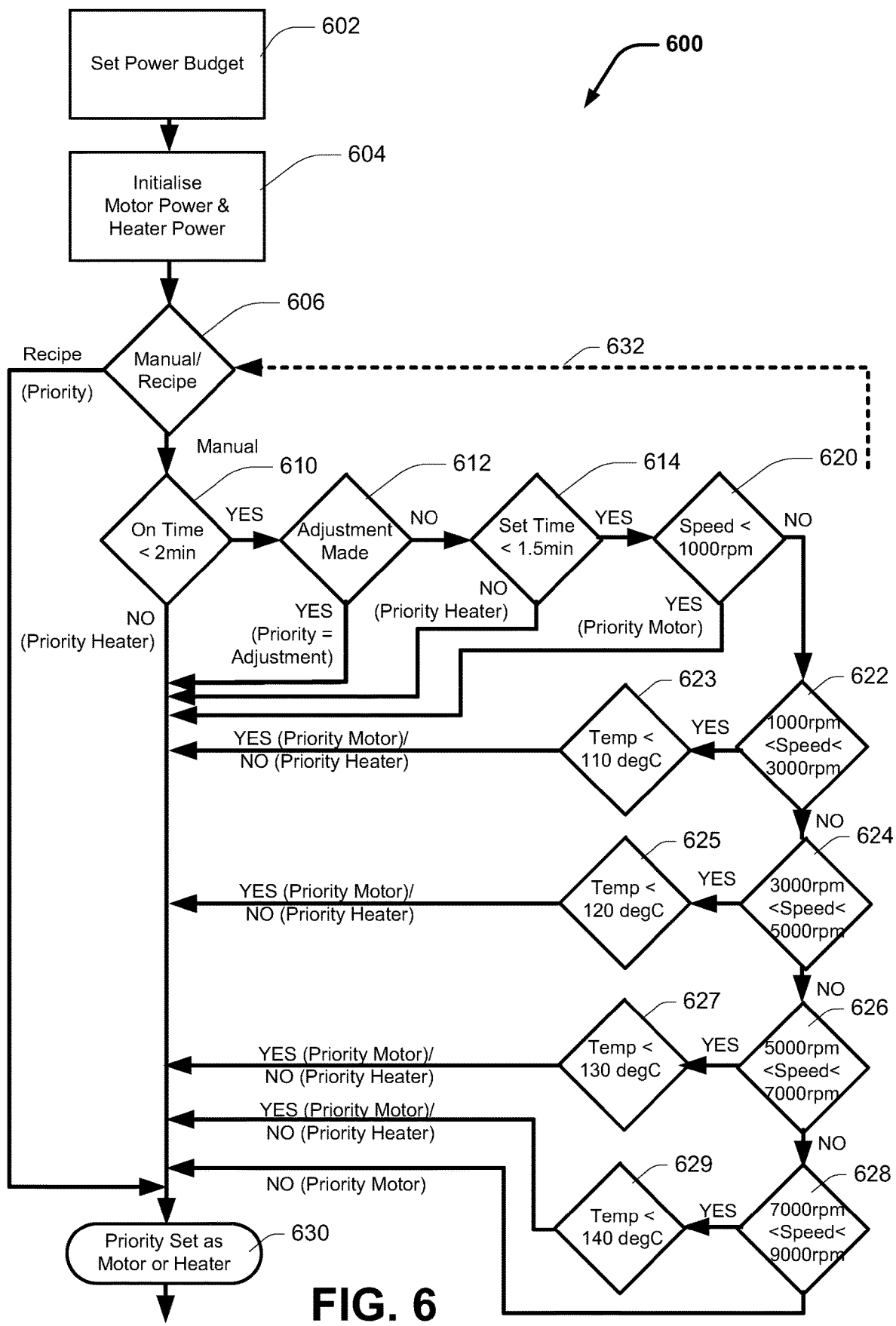
FIG. 6 is a flowchart for an example embodiment method of prioritising power allocation in a heated blender.

Referring initially to FIG. 6, a method is taught for identifying the power sharing priority as either being the motor or the heater. By way of example only, the method 600 may include the steps of:

STEP 602: Setting a total power budget for the motor and heater.

STEP 604: Initialising the required motor power and required heater power—which, by way of example only, may include setting the required power to be that of the rated power of each load element.

STEP 606: determining if the user has selected a manual setting or a specific recipe; if a recipe setting has been selected, the recipe can include priority settings and proceed to having the priority set as either the motor or heater (at STEP 630)—or alternatively continue as if the recipe setting was set manually; if a manual setting has been selected then proceed to STEP 610 for further determining a priority of either the motor or the heater.

STEP 610: If the "on time" (or operating time) is less than 2 minutes proceed to STEP 612 for further determining a priority of either the motor or the heater; otherwise priority is set to the heater and proceed to STEP 630.

STEP 612: Determine if there has been a manual adjustment; if an adjustment has been made to either the motor speed or heat temperature, set the priority to the motor or heater respectively and proceed to STEP 630; otherwise proceed to STEP 614 for further determining a priority as either the motor or the heater.

STEP 614: Determine if the current set time is less than 1.5 minutes; if the current set time is less than 1.5 minutes proceed to STEP 620 for further determining a priority as either the motor or the heater; otherwise the priority setting is the heater and proceed to STEP 630.

STEP 620: If the speed setting is less than 1000 RPM, set the priority to the motor and proceed to STEP 630—otherwise proceed to STEP 622 for further determining a priority as either the motor or the heater.

STEP 622: If the motor speed is between 1000 RPM and 3000 RPM, then if the set temperature is less than or greater than 110 deg C. set the priority to the motor or the heater respectively (at STEP 623) and proceed to STEP 630; otherwise proceed to STEP 624 for further determining a priority as either the motor or the heater.

STEP 624: If the motor speed is between 3000 RPM and 5000 RPM then if the set temperature is less than or greater than 120 deg C. set the priority to the motor or the heater respectively (at STEP 625) and proceed to STEP 630; otherwise proceed to STEP 626 for further determining a priority as either the motor or the heater.

STEP 626: If the motor speed is between 5000 RPM and 7000 RPM then if the set temperature is less than or greater than 130 deg C. set the priority to the motor or the heater respectively (at STEP 627) and proceed to STEP 630; otherwise proceed to STEP 628 for further determining a priority as either the motor or the heater.

STEP 628: If the motor speed is between 7000 RPM and 9000 RPM then if the set temperature is less than or greater than 140 deg C. set the priority to the motor or the heater respectively (at STEP 629) and proceed to STEP 630; otherwise set the priority to the Motor and proceed to STEP 630.

STEP 630: Set the priority as either the motor or the heater for determining power sharing.

It will be appreciated that method 600 can be repeated (at 632), for actively reconfiguring the power budget during operation of the appliance.

With the priority set the power allocation can be made to the motor and heater based on the predetermined power budget.

Figure 7A:
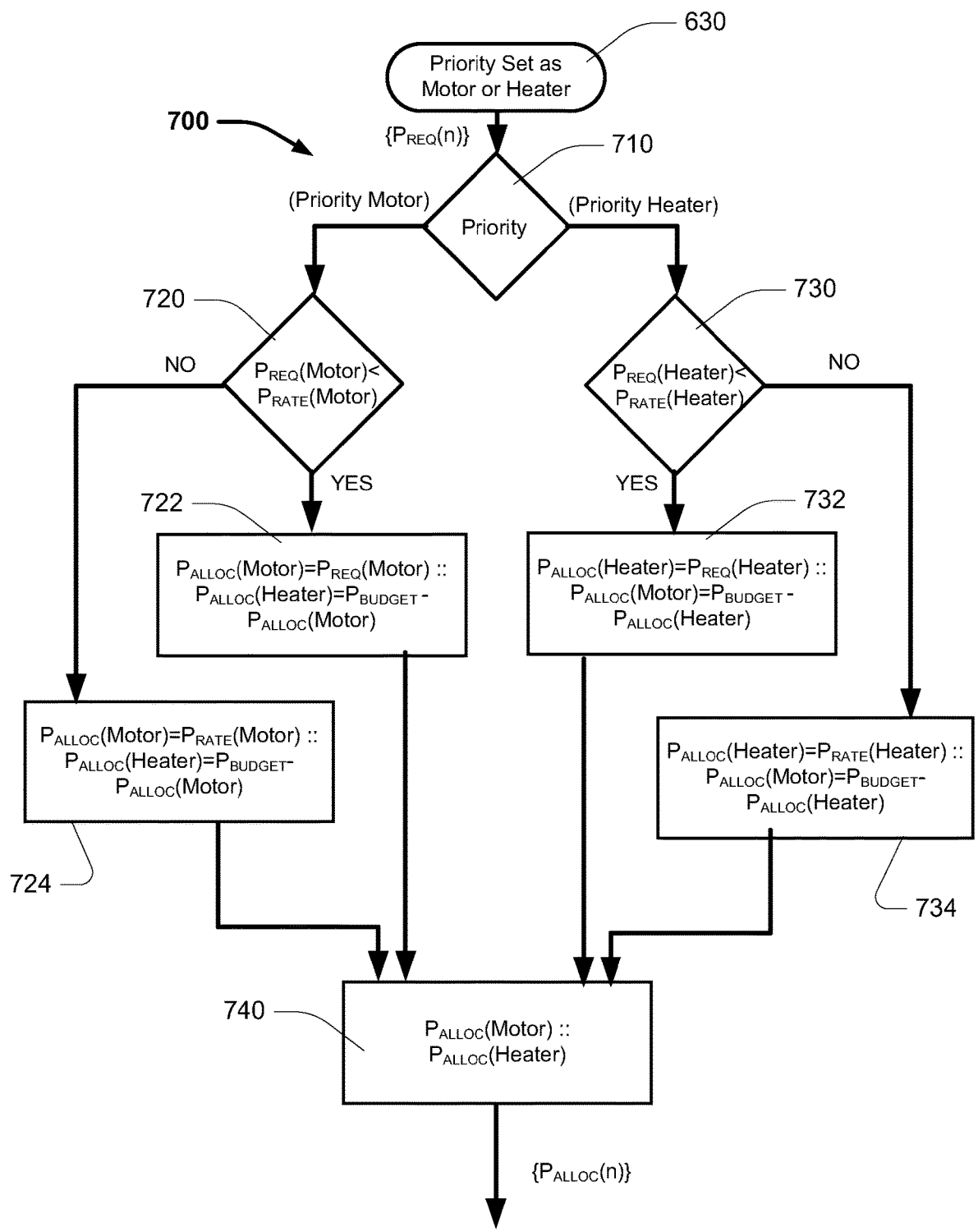
FIG. 7A is a flowchart for an example embodiment method of allocating power to a motor load element and a heater load element in a heated blender.
Figure 7B:
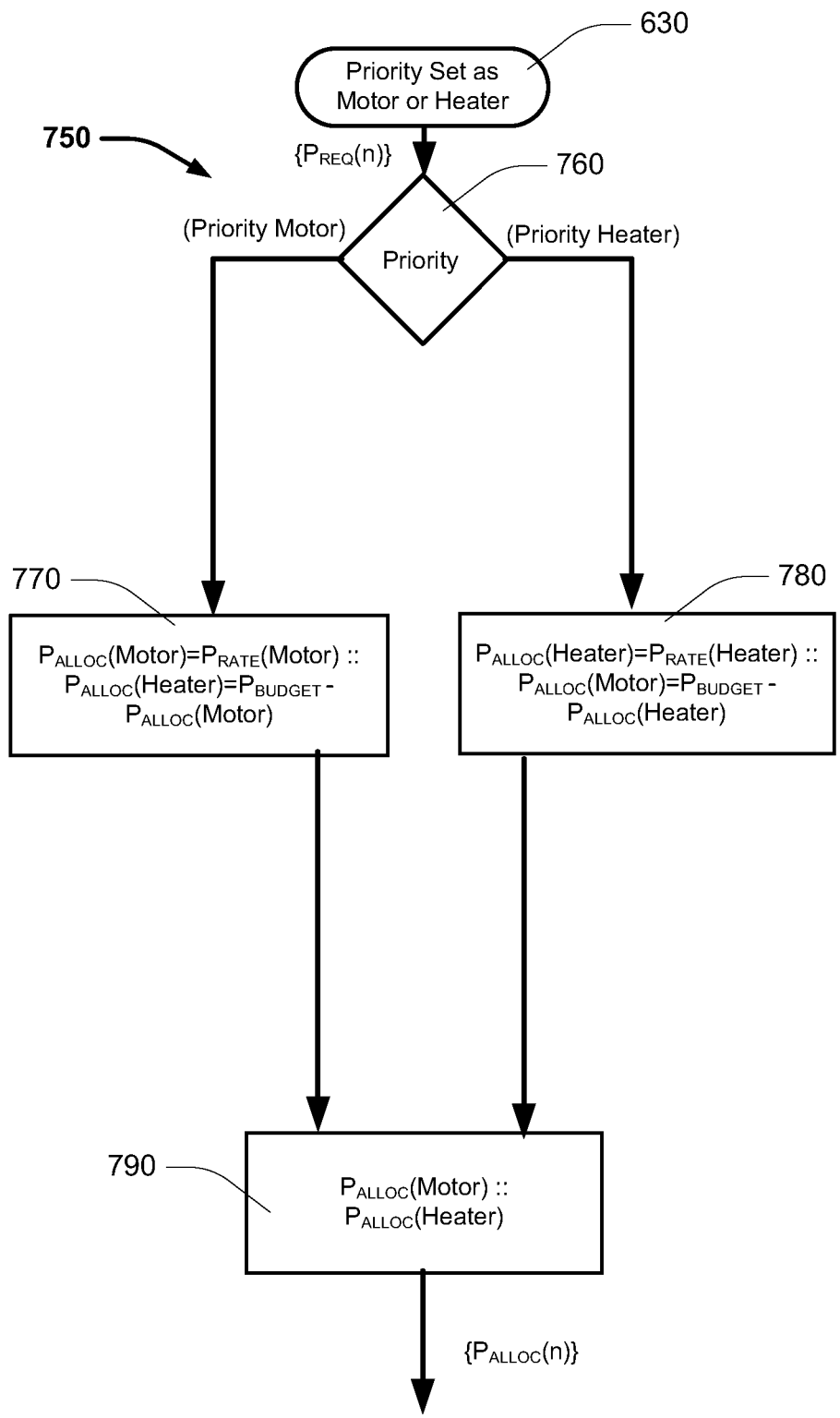
FIG. 7B is a flowchart for an example alternative embodiment method of allocating power to a motor load element and a heater load element in a heated blender.

FIG. 7A and FIG. 7B show, by way of example only, alternative embodiment methods of setting allocated power for the motor and heater in a heated blender (for example, as shown in FIG. 1A or FIG. 1B).

FIG. 7A is a flowchart for an example embodiment method 700 of allocating power to the motor and heater in a heated blender.

The method 700 for allocating power to the motor and heater, based on the priority set as either the motor or heater (for example at STEP 630), can include the steps of:

STEP 710: If the priority is the motor, proceed to STEP 720, if the priority is the heater proceed to STEP 730.

STEP 720: If the current power required by the motor {$P_{REQ}$(Motor)} is less than the rated power of the motor {$P_{RATE}$ (Motor)}, proceed to STEP 722; otherwise proceed to STEP 724.

STEP 722: Set: (a) the allocated power for the motor {$P_{ALLOC}$(Motor)} as the power required for the motor {$P_{REQ}$(Motor)}; and (b) the allocated power for the heater {$P_{ALLOC}$(Heater)} being the power budget {$P_{BUDGET}$} less the power allocated to the motor {$P_{ALLOC}$(Motor)}; proceeding to STEP 740.

STEP 724: Set: (a) the power allocated to the motor {$P_{ALLOC}$(Motor)} as the rated power for the motor {$P_{RATE}$(Motor)}; and (b) the allocated power for the heater {$P_{ALLOC}$(Heater)} being the power budget {$P_{BUDGET}$} less the power allocated to the motor {$P_{ALLOC}$(Motor)}; proceeding to STEP 740.

STEP 730: If the current power required by the heater {$P_{REQ}$(Heater)} is less than the rated power of the heater {$P_{RATE}$ (Heater)}, proceed to STEP 732; otherwise proceed to STEP 734.

STEP 732: Set: (a) the allocated power for the heater {$P_{ALLOC}$(Heater)} as the power required for the heater {$P_{REQ}$(Heater)}; and (b) the allocated power for the motor {$P_{ALLOC}$(Motor)} being the power budget {$P_{BUDGET}$} less the power allocated to the heater {$P_{ALLOC}$(Heater)}; proceeding to STEP 740.

STEP 734: Set: (a) the power allocated to the heater {$P_{ALLOC}$(Heater)} as the rated power for the heater {$P_{RATE}$(Heater)}; and (b) the allocated power for the motor {$P_{ALLOC}$(Motor)} being the power budget {$P_{BUDGET}$} less the power allocated to the heater {$P_{ALLOC}$(Heater)}; proceeding to STEP 740.

STEP 740: Record or set the power allocated for the motor and heater {$P_{ALLOC}$(Motor), $P_{ALLOC}$(Heater)}.

FIG. 7B is a flowchart for an alternative example embodiment method 750 of allocating power to the motor and heater in a heated blender.

The method 750 for allocating power to the motor and heater, based on the priority as being set as either the motor or heater (for example at STEP 630), can include the steps of:

STEP 760: If the priority is the motor, proceed to STEP 770, if the priority is the heater proceed to STEP 780.

STEP 770: Set: (a) the power allocated to the motor $\{P_{ALLOC}(\text{Motor})\}$ as the rated power for the motor $\{P_{RATE}(\text{Motor})\}$; and (b) the allocated power for the heater $\{P_{ALLOC}(\text{Heater})\}$ being the power budget $\{P_{BUDGET}\}$ less the power allocated to the motor $\{P_{ALLOC}(\text{Motor})\}$; proceeding to STEP 790.

STEP 780: Set: (a) the power allocated to the heater $\{P_{ALLOC}(\text{Heater})\}$ as the rated power for the heater $\{P_{RATE}(\text{Heater})\}$; and (b) the allocated power for the motor $\{P_{ALLOC}(\text{Motor})\}$ being the power budget $\{P_{BUDGET}\}$ less the power allocated to the heater $\{P_{ALLOC}(\text{Heater})\}$; proceeding to STEP 790.

STEP 790: Record or set the power allocated for the motor and heater $\{P_{ALLOC}(\text{Motor}), P_{ALLOC}(\text{Heater})\}$.

With the power allocated to the motor and the heater, the next step is to determine whether or the allocated power is sufficient (or not) and adjust the power required (or requested) for each load element.

Figure 8A:
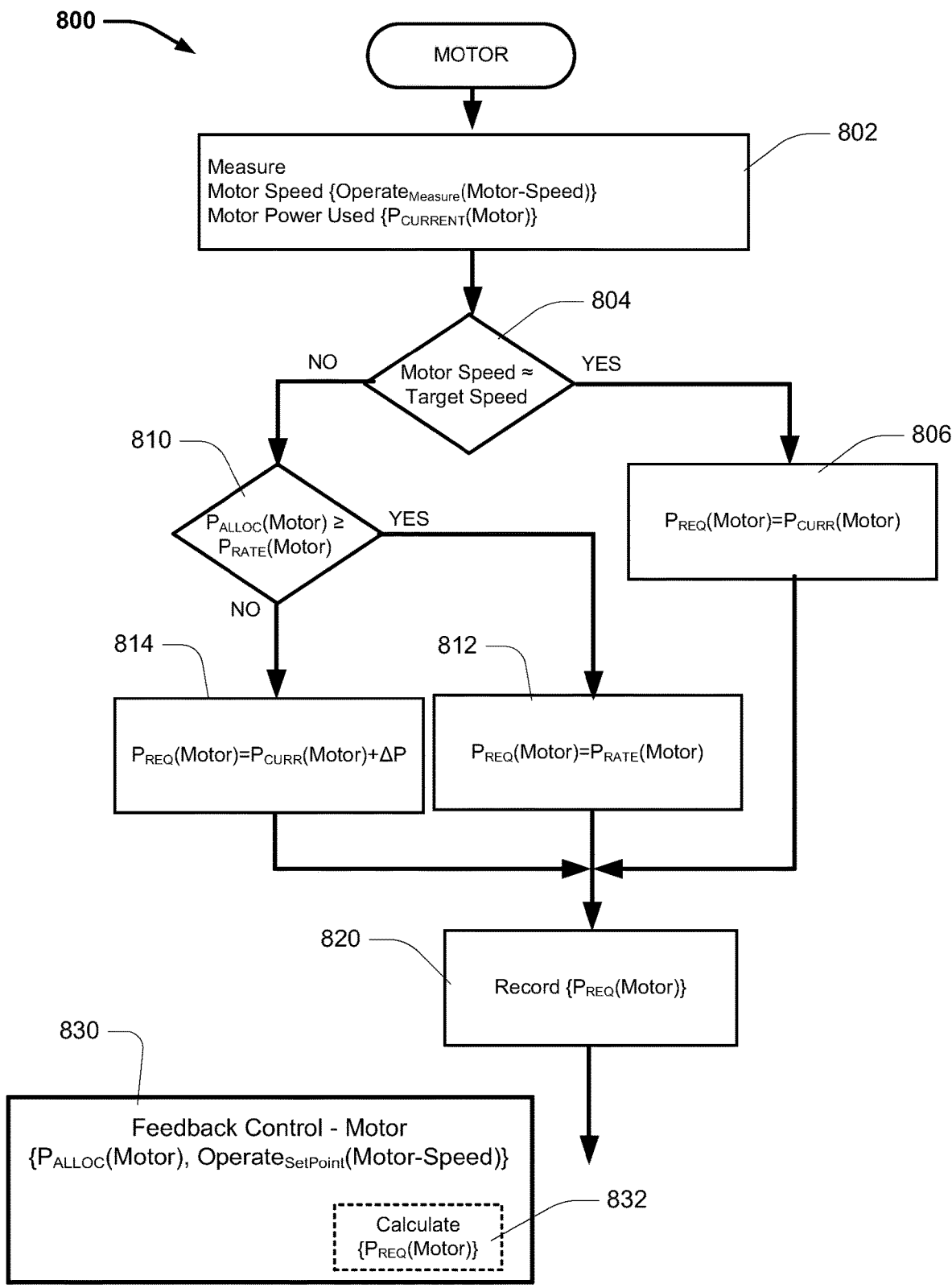
FIG. 8A is a flowchart for an example embodiment method of determining a power required for a motor load element in heated blender.

FIG. 8A is a flowchart for an embodiment method of determining a power required for a motor load element in heated blender (for example, as shown in FIG. 1A or FIG. 1B), by way of example only.

FIG. 8A shows an embodiment method 800 of determining a power required for a motor load element in heated blender. The method may include the steps of:

STEP 802: Measuring the current motor speed $\{\text{Operate}_{Measure}(\text{Motor-Speed})\}$ and the current motor power $\{P_{CURRENT}(\text{Motor})\}$, proceeding to STEP 804.

STEP 804: If the motor speed is approximately equal to the target speed $\{\text{Operate}_{SetPoint}(\text{Motor-Speed})\}$, for example within a predetermined threshold (e.g. within 5%-10% of the target speed), then proceed to STEP 806, otherwise proceed to STEP 810.

STEP 806: Set the power required for the motor $\{P_{REQ}(\text{Motor})\}$ as the current power for the motor $\{P_{CURR}(\text{Motor})\}$, then proceed to STEP 820.

STEP 810: If the power allocated to the motor $\{P_{ALLOC}(\text{Motor})\}$ is already the rated power for the motor $\{P_{RATE}(\text{Motor})\}$, proceed to STEP 812, otherwise proceed to STEP 814.

STEP 812: Set the power required for the motor $\{P_{REQ}(\text{Motor})\}$ as the rated power for the motor $\{P_{RATE}(\text{Motor})\}$, then proceed to STEP 820.

STEP 814: Set the power required for the motor $\{P_{REQ}(\text{Motor})\}$ as the current power $\{P_{CURR}(\text{Motor})\}$ plus a predetermined (or calculated) offset $\Delta P$, then proceed to STEP 820.

STEP 820: Recording the estimated power required for motor $\{P_{REQ}(\text{Motor})\}$.

It will be appreciated that the motor speed would typically be controlled by a feedback controller 830. A feedback controller for the motor will be provided with the allocated power $\{P_{ALLOC}(\text{Motor})\}$ and the operating set point for motor-speed $\{\text{Operate}_{SetPoint}(\text{Motor-Speed})\}$. The feedback controller may be further adapted to perform the steps of estimating a power required for the motor $\{P_{REQ}(\text{Motor})\}$, to achieve the target set point (at 832). By way of example only, adaptation of the feedback controller could include determining the increased power required from the current power (for example, at 814). It would be appreciated that the feedback controller can also set power required as the current power once a target speed has been achieved (for example at STEP 806). The feedback controller can also limit the power requested to be no more than the power rating for that motor (for example at STEP 812).

It would be appreciated that a similar method can be used when controlling motor torque $\{\text{Operate}_{Measure}(\text{Motor-Torque})\}$, wherein the control adjust power to the motor subject to an allocated limit $\{P_{ALLOC}(\text{Motor})\}$ for reaching a set point $\{\text{Operate}_{SetPoint}(\text{Motor-Torque})\}$, and calculate the required or requested power $\{P_{REQ}(\text{Motor})\}$.

Figure 8B:
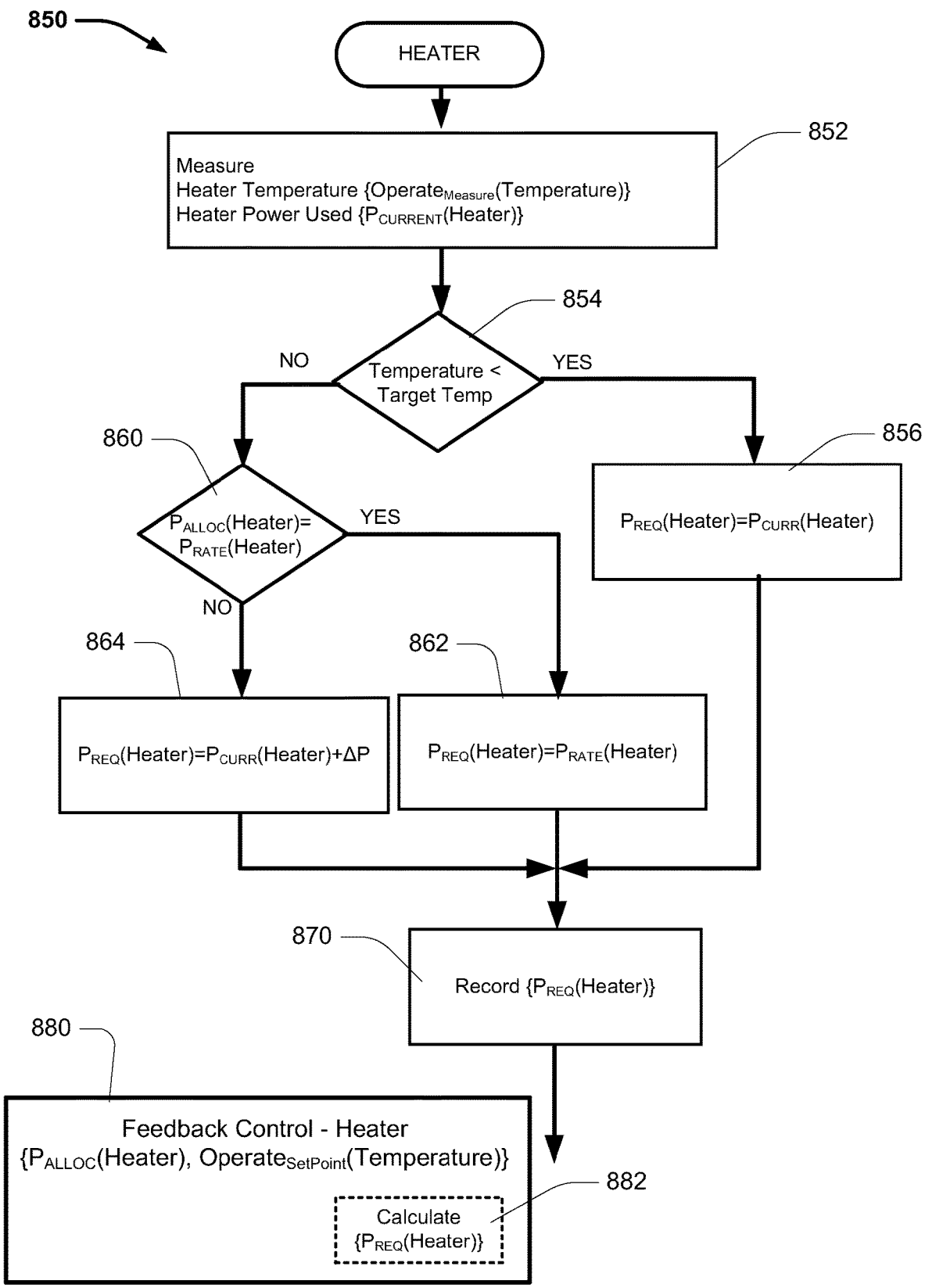
FIG. 8B is a flowchart for an example embodiment method of determining a power required for a heater load element in heated blender.

FIG. 8B is a flowchart for an embodiment method of determining a power required for a heater load element in heated blender (for example, as shown in FIG. 1A or FIG. 1B), by way of example only.

FIG. 8B shows an embodiment method 850 of determining a power required for a heater load element in heated blender, the method may include the steps of:

STEP 852: Measuring the current temperature $\{\text{Operate}_{Measure}(\text{Temperature})\}$ and the current heater power $\{P_{CURRENT}(\text{Heater})\}$, proceeding to STEP 854.

STEP 854: If the temperature is about the target temperature $\{\text{Operate}_{SetPoint}(\text{Temperature})\}$, for example within a predetermined threshold, equal to, or exceeding, then proceed to STEP 856, otherwise proceed to STEP 860.

STEP 856: Set the power required for the heater $\{P_{REQ}(\text{Heater})\}$ as the current power for the heater $\{P_{CURR}(\text{Heater})\}$, then proceed to STEP 870.

STEP 860: If the power allocated to the heater $\{P_{ALLOC}(\text{Heater})\}$ is already the rated power for the heater $\{P_{RATE}(\text{Heater})\}$, proceed to STEP 862, otherwise proceed to STEP 864.

STEP 862: Set the power required for the heater $\{P_{REQ}(\text{Heater})\}$ as the rated power for the heater $\{P_{RATE}(\text{Heater})\}$, then proceed to STEP 870.

STEP 864: Set the power required for the heater $\{P_{REQ}(\text{Heater})\}$ as the current power $\{P_{CURR}(\text{Heater})\}$ plus a predetermined (or calculated) offset $\Delta P$, then proceed to STEP 870.

STEP 870: Recording the estimated power required for heater $\{P_{REQ}(\text{Heater})\}$.

It will be appreciated that the temperature would typically be controlled by a feedback controller 880. A feedback controller for the heater will be provided with the allocated power $\{P_{ALLOC}(\text{Heater})\}$ and the operating set point for Temperature $\{\text{Operate}_{SetPoint}(\text{Temperature})\}$. The feedback controller may be further adapted to perform the steps of estimating a power required for the heater $\{P_{REQ}(\text{Heater})\}$, to achieve the target set point (at 882). By way of example only, adaptation of the feedback controller could include determining the increased power required from the current power (for example, at 864). It would be appreciated that the feedback controller can also set power required as the current power once a target temperature has been achieved (for example at STEP 856). The feedback controller can also limit the power requested to be no more than the power rating for that heater (for example at STEP 862).

It will be appreciated that the illustrated embodiments teach an apparatus and method that controls a plurality of power load elements, each having a respective power rating that sum to a total power, and wherein each of the power load elements are controlled such that the power drawn by all elements at any time of operation does not exceed a predetermined power limit that is less that the total power. The type of control is dependent on the load element and associated operating parameter being controlled (for example, rotational speed and/or rotational torque and/or temperature), where in a power limit is applied to each load element control.

It will be appreciated that the method of allocating power to a plurality of load elements can be used by any kitchen appliance that has two or more electrical loads. By way of example, the kitchen apparatus may include both a motor power load element and a power load element for heating.

Figure 9A:
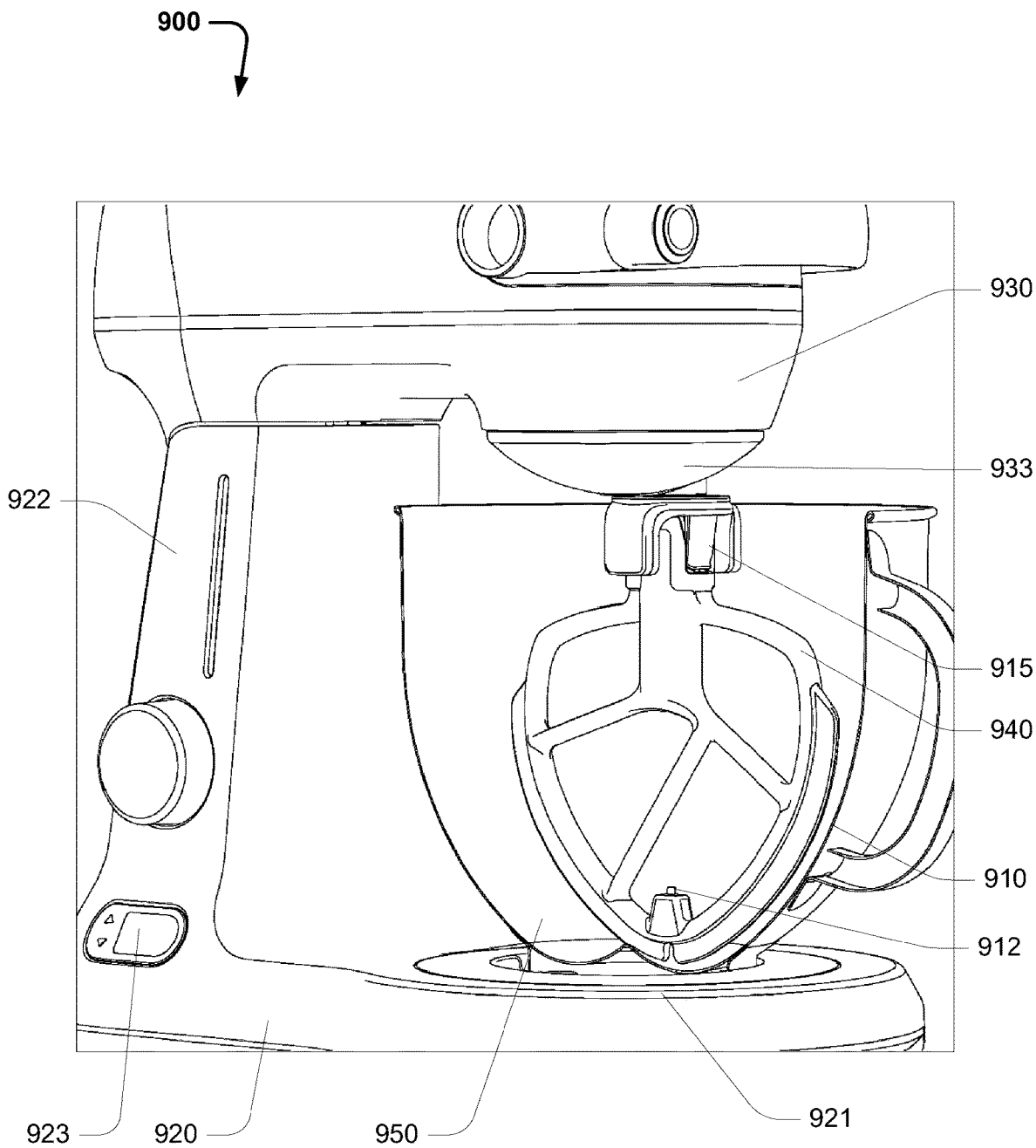
FIG. 9A shows a side view of a stand mixer according to the present disclosure.
Figure 9B:
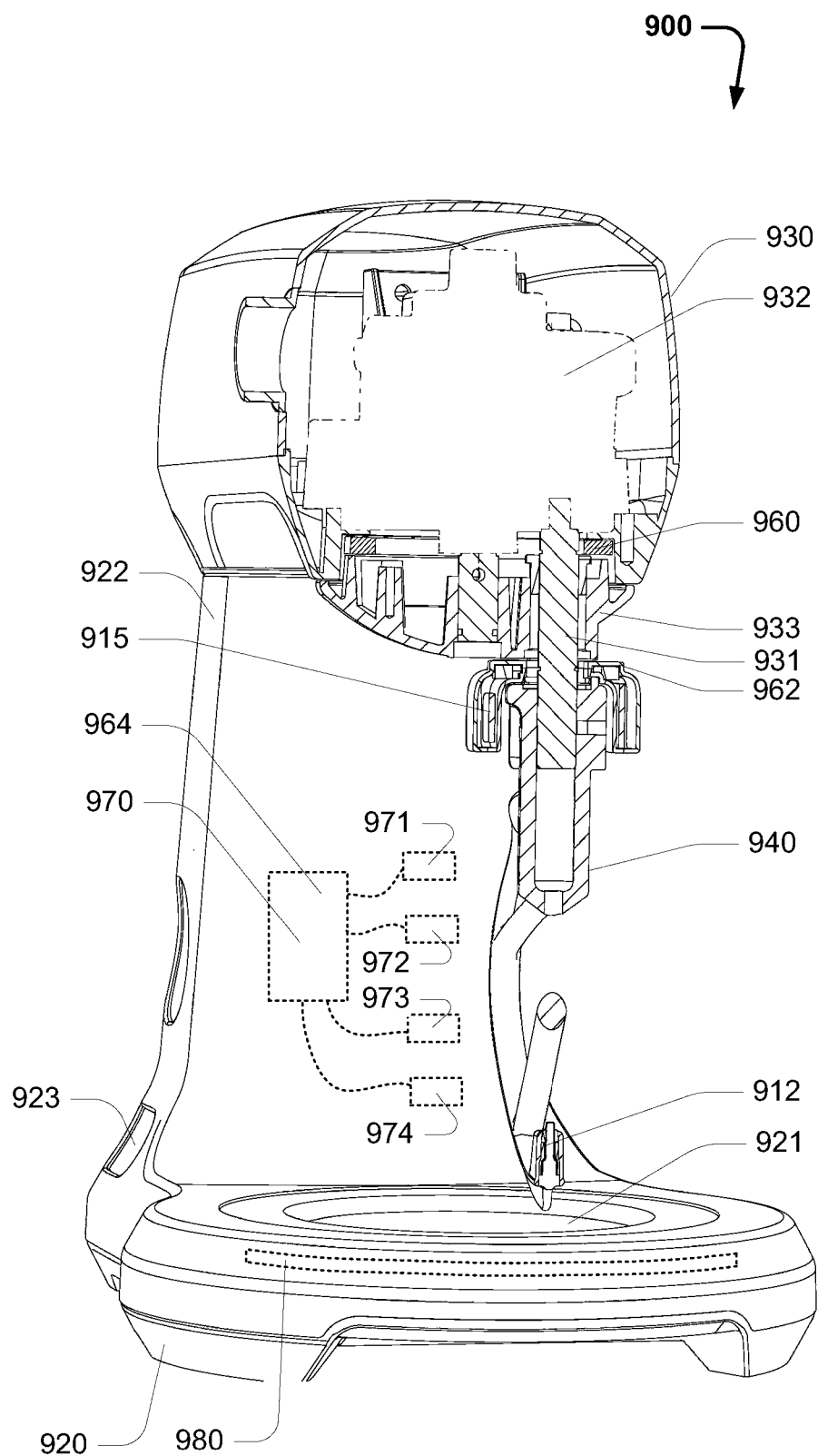
FIG. 9B shows a sectional view of the stand mixer 100 shown in FIG. 9A.

FIG. 9A shows a side view of a example embodiment stand mixer 900 according to the current disclosure. FIG. 9B shows a sectional view of the stand mixer 900 shown in FIG. 9A. The stand mixer 900 has a pedestal 920 having a base 921 for supporting a mixing bowl 910, and an upright portion 922 for pivotally supporting a head assembly 930 of the stand mixer 900. The head assembly 930 houses an electric motor and drive system 932. The head assembly 930 also has a rotating head 933 and a drive shaft 931 extending therefrom, overhead of the bowl 910.

Different attachments are removably attachable to the drive shaft 931. The attachment shown in FIG. 9A and FIG. 9B is a beater 940. When attached, the attachment is suspended into the bowl 910 from the drive shaft 931. The drive shaft 931 and rotating head 933, when driven by the electric motor and drive system 932, imparts a planetary mixing action to the attachment. Each attachment has special features, allowing a wide variety of tasks to be performed by the stand mixer 900, including whisking, beating, dough kneading, etc.

In an example embodiment, the base 921 may include a heating element 980 (or means) for heating the bowl 910, which in turn transfers that heat to the content 950 of the bowl whilst that content is being subjected to the planetary mixing action. In the preferred implementation the heating element 980 is an induction-heating load element uses induction heating to heat the bowl containing a ferromagnetic metal (for example magnetic stainless steel). More particularly, an induction coil or coils 980 are incorporated into the base 921, which when energized those coils induce eddy currents in the base of the bowl, for causing the bowl to heat. It will be appreciated that other methods of heating the bowl may also be used. In this embodiment, the heating elements is preferably able to heat the bowl to any temperature from ambient up to 180 degrees Celsius.

The stand mixer 100 further includes one or more temperature sensors 912, such as negative temperature coefficient (NTC) sensors, for sensing the temperature of the content of the bowl 910. Advantageously the temperature sensors 912 are incorporated within the attachment. The attachment may be made of a plastics material, allowing the temperature sensors 912 to be moulded within the attachment. In use the temperature sensors 912 are not only in contact with the content, but also move through the content following the planetary mixing action, thereby sensing the temperature throughout the content to permit accurate temperature measurements to be made.

The upright portion 922 of the pedestal 920 further includes a user interface 923 for receiving user settings, including mixing speed, temperature and mixing and/or heating times. A microprocessor based controller 970 is also provided for controlling the operation of the stand mixer 900. More particularly, the controller uses user settings received through the user interface 923 and input from sensors (including the temperature sensor 912), to control the electric motor 932 (i.e. motor speed and operation period) and the heating element 980 (i.e. temperature and duration of heating).

Speed profile controls or temperature profile controls can also be provided by which the speed and/or temperature settings change over time. For example, a "slow start" control causes the speed setting to be low initially, and causes the speed setting to gradually increase to the speed set by the user. Similarly, a "slow heat" control causes the temperature of the content to slowly increase to the user set temperature.

The controller has stored therein pre-programmed cooking operations which may be selected through the user interface 923 to cause the stand mixer 900 to perform a series of pre-determined operational cooking and mixing sequences without requiring the user to input all of the individual instructions. The controller may use one or more measured food characteristics (such as the measured temperature), lapsed food preparation time, or a combination of both to advance through the sequence.

The temperature sensed by the temperature sensors 912 is transmitted wirelessly, for example by infrared and/or radio frequency communication, such as using the Bluetooth protocols. Accordingly, the attachment (i.e. the beater 940 shown in FIG. 9A) includes or attaches to a transmitter 915, the transmitter 915 receiving input from the temperature sensors 912.

In a preferred implementation the transmitter 915 and associated circuitry are powered using wireless power transfer (WPT) from the head assembly 930. In an example embodiment WPT, the head assembly 930 includes a primary coil 960 positioned proximal the rotating head 933, and the attachment includes a secondary coil 962 arranged around the aperture for receiving the drive shaft 931. By way of example, an oscillator circuit 964 generates a high frequency alternating current to drive the primary coil 960. The coils 960 and 962 are inductively coupled to induce an alternating current in secondary coil 962.

FIG. 9A and FIG. 9B show an embodiment heated bench mixer 900 that includes a base 921 having a user interface 923. The base supports a removable cooking vessel 910.

Referring to FIG. 9B, the appliance 900 further includes a controller module (e.g. printed circuit board or a processor module) 970 that controls a motor load element 932 and a heating load element 980.

The motor load element 932 is coupled to the beater 940 (as shown in FIG. 9A) that is located within the vessel.

The heating load element 980 is used for heating ingredients within the vessel.

Sensors 971, 972 (e.g. power sensors and/or current sensors and/or voltage sensors) are associated with the motor load element and the heating load element respectively. The sensors 971, 972 are coupled to the control module 970 for enabling measurement of the power currently being used by the respective load element.

A speed sensor 973 and temperature sensor 974 (or 912) are also associated with the motor load element and the heater load element respectively. The sensors 973,974 are coupled to the control module 970 for enabling feedback control of motor speed and temperature heating. In an alternative embodiment, the sensors 973,974 may be coupled to the control module 970 for enabling feedback control of motor torque and temperature heating.

It would be further appreciated that the current sensor 971 and the speed sensor 973, each associated with the motor load element 932, can enable the control module 970 to provide speed feedback control of the motor while monitoring the current power consumption and restricting power consumption below a predetermined allocated power limit.

It will be appreciated that the current sensor 972 and temperature sensor 974, each associated with the heating load element, can enable the control module 970 to provide temperature feedback control of the heater while monitoring the current power consumption and restricting power consumption below a predetermined allocated power limit.

It will be appreciated that system elements may also factor into the power budget, such that the apparatus may continue to operate. The power budget may allocate necessary power for system elements including permanent power consumption (e.g. user interface 923 and control module 970) and intermediate or switched power consumption (e.g. cooling fans). Being necessary for operation of some appliance, these features may take overall priority.

In an example embodiment, the bench mixer may rely on thermal conductive or inductive heating of the vessel. A heating element or induction element 980 may be included in the base 920 or the head assembly 930. A heating element or induction element 980 and motor element 932 may be controlled as part of the disclosed power sharing method.

Interpretation

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A kitchen apparatus, the kitchen apparatus including: two or more power load elements;
    a processor module adapted to dynamically allocate an amount of available power to share between all of the power load elements;
    a user interface coupled to the processor module for receiving operating parameters;
    one or more sensors coupled to the processor module for receiving measured parameters;
    wherein a ratio of power allocated to a power load element is based on a priority condition of operation of the power load elements, operating parameters, and measured parameters, wherein the processor module is further configured to receive a recipe and set the priority condition of operation based on the recipe.

2. The kitchen apparatus according to claim 1, wherein the kitchen apparatus has both a motor power load element and a power load element for heating.

3. The kitchen apparatus according to claim 1, wherein the kitchen apparatus is a blender or a mixer.

4. The kitchen apparatus according to claim 1, wherein the processor module is arranged to dynamically allocate available power between the power load elements by:
    (a) allocating available power between two or more power load elements, wherein a ratio of power allocated to a power load element of the two or more power load elements is based on (i) the priority and (ii) the measured parameters; and
    (b) dynamically updating the available power that is allocated to a power load element of the two or more power load elements based on the priority condition and the measured parameters as power requirements change.

5. A method of power allocation in a heated blender for processing and/or heating a food ingredient, the method comprising the steps of:
    (a) allocating, by a control module, an amount of available power to be shared between a plurality of power load elements in the heated blender, where the power load elements comprise at least a first power load element and a second power load element;
    (b) setting a target operating parameter for the first power load element and a second power load element respectively, wherein the target operating parameter is set by a user, a recipe, or a current configuration of the heated blender;
    (c) in response to the setting of the target operating parameter, assigning by the control module, a higher priority to the first power load element, wherein by assigning the higher priority to the first power load element the method further comprises the steps of:
        i) receiving, at the second power element, a power amount after the first power element has received necessary power required for reaching the target operating parameter, or
        ii) allocating, by the control module, a first amount of power to the first power load element and a second amount of power to the second power load element;
    wherein the first power load element and the second power load element are configured to operate in tandem to draw a combined power that does not exceed a regulatory power limit assigned to the heated blender, and
    wherein the first power load element and second power load element comprise a heating element and a motor.

6. The method of claim 5 further comprising the steps of determining, by the control module, a current blending load of the motor, and
    determining, by the control module, whether the heating element currently requires its allocated power,
    and, based on the determined current blending load and whether the heating element currently requires its allocated power,
    allocating, by the control module, an additional amount of power to the motor from an amount of available power allocated by the control module to the heating element.

7. The method according to claim 5, wherein the power allocated to the power load elements is updated as power requirements change for the power load element that is allocated power.

8. The method according to claim 5, wherein the power allocated to the power load element is updated as power requirements change for a system module of the heated blender.

9. The method according to claim 8, wherein the power allocated between the power load elements is further updated as power requirements change for the power load element that is allocated power.

10. The method according to claim 5, wherein the method iteratively updates power allocated between the two or more power load elements as the power requirements change.

11. The method according to claim 5, wherein a ratio of power allocated to a power load element is based on the target operating parameter.

12. The method according to claim 11, wherein the target operating parameter includes one or more of the set comprising speed, torque, temperature, and time.

13. The method according to claim 5, further comprising, allocating an amount of available power to share between all of the power load elements in the heated blender, wherein a ratio of power allocated to a power load element is based on at least one measured parameter, and dynamically updating the amount of available power that is allocated to a power load element based on the at least one measured parameter.

14. The method according to claim 5, wherein a power load element of the two or more power load elements with a highest priority is allocated all power required for that power load element to achieve the target operating parameter, subject to available power constraints.

15. The method according to claim 14, wherein a power load element of the two or more power load elements with a second highest priority is allocated the power required for that power load element or any excess power after the highest priority power load element has been allocated power.

16. The method according to claim 15, wherein a power load element with a next highest priority is allocated the power required for that power load element or any excess power after power load elements with higher priority have been allocated power.

17. The method according to claim 5, wherein a priority condition of a power load element is based on the target operating parameter, and the order in which one or more of the target operating parameter are received.

18. The method according to claim 5, wherein power allocation includes calculating ratios of power required for a power load element to maintain a power budget.

19. The method according to claim 13, wherein the at least one measured parameter includes one or more of the set comprising speed, torque, temperature, and time.

\* \* \* \* \*